United States Patent [19]
Kanemoto et al.

[11] 3,840,178
[45] Oct. 8, 1974

[54] AUTOMATIC TEMPERATURE CONTROLLER FOR AIR CONDITIONERS

[75] Inventors: Kazoo Kanemoto, Katsuta; Toshikatsu Ito, Ibaraki; Matsuo Amano, Hitachi, all of Japan

[73] Assignee: Hitachi, Ltd., Tokyo, Japan

[22] Filed: July 16, 1971

[21] Appl. No.: 163,344

[30] Foreign Application Priority Data
July 20, 1970 Japan.............................. 45-62849

[52] U.S. Cl.................... 236/86, 137/627.5, 236/99
[51] Int. Cl. ......................................... G05d 23/275
[58] Field of Search ............ 236/80, 82, 86, 99, 42; 137/83, 627.5; 237/12.3 A, 12.3 B

[56] References Cited
UNITED STATES PATENTS

| | | | |
|---|---|---|---|
| 2,858,840 | 11/1958 | Wright, Jr..................... | 137/627.5 X |
| 2,924,388 | 2/1960 | Beck et al............................. | 236/99 |
| 3,006,552 | 10/1961 | Ferris................................ | 236/86 X |
| 3,125,111 | 3/1964 | Daly................................ | 236/86 UX |
| 3,135,495 | 6/1964 | Ferris................................ | 236/86 X |
| 3,156,413 | 11/1964 | Porland............................. | 236/99 X |
| 3,338,518 | 8/1967 | Barbier ....................... | 236/86 |
| 3,373,935 | 3/1968 | Thorburn.............................. | 236/82 |
| 3,394,687 | 7/1968 | Scott................................... | 123/119 |

Primary Examiner—William E. Wayner
Attorney, Agent, or Firm—Craig & Antonelli

[57] ABSTRACT

A control valve is disposed for the axial movement in a cylinder provided with an input and output ports through which air under pressure is admitted into the cylinder and discharged out of it respectively. The control valve is displaced to open or close the output port in response to the difference between the output pressure and the force exerting to the control valve from a member which is disposed also in the cylinder and is displaced in response to a detected temperature. The output pressure actuates a temperature control valve in an air conditioner.

13 Claims, 5 Drawing Figures

AUTOMATIC TEMPERATURE CONTROLLER FOR AIR CONDITIONERS

BACKGROUND OF THE INVENTION

The present invention relates to a temperature controller of the type which measures the controlled temperature and functions in response to the difference between the measured and desired temperatures to maintain a predetermined constant temperature, and more particularly a temperature controller for use with an air conditioner of the type in which the air under predetermined pressure from an air pressure source actuates a control valve which is adapted to change the flow rate of the air flowing through a heater core or evaporator, thereby controlling the temperature.

In the prior art temperature controllers for use with the air conditioners of the type described, the measured temperature is converted into an electrical quantity which in turn is converted into mechanical movement. In response to this mechanical movement, the negative pressure output is derived from the constant negative pressure source so as to determine the degree of opening of the control valve. Since the measured temperature is converted into other quantities such as electrical quantity and mechanical movement as described above, the prior art temperature controllers are not stable and reliable in operation. Furthermore, they have a common defect that electrical or electronic elements used are very expensive.

Another type of the prior art temperature controller is such that the volumetric change of a liquid in response to the temperature variation is detected and transduced into mechanical movement to change the output air pressure so as to control the control valve. In this system, the force due to the volumetric change is magnified by the processes of converting the volumetric change into mechanical movement and mechanical movement into a constant negative pressure in order to operate the control valve with the negative pressure. This system is however inferior to the electrical system described above and is not practical in use because the construction is complicated, the productivity is poor and the negative pressure is consumed in large quantity.

SUMMARY OF THE INVENTION

One of the objects of the present invention is to provide an automatic temperature controller for air conditioners which is compact in size, simple in construction and inexpensive to manufacture.

Another object of the present invention is to provide an automatic temperature controller for air conditioners which is reliable in operation with the minimum of air consumption.

Briefly stated, the present invention is characterized in that a control valve disposed within a cylinder is displaced axially thereof to open or close an air pressure output port of the cylinder, which is also provided with an air pressure input port, in response to the difference between the output pressure and the force exerted to the control valve from a member which is also disposed within the cylinder and is displaced in response to the measured temperature, thereby actuating a temperature control valve in the air conditioner.

DESCRIPTION OF THE PREFERRED EMBODIMENTS

Figure 1:
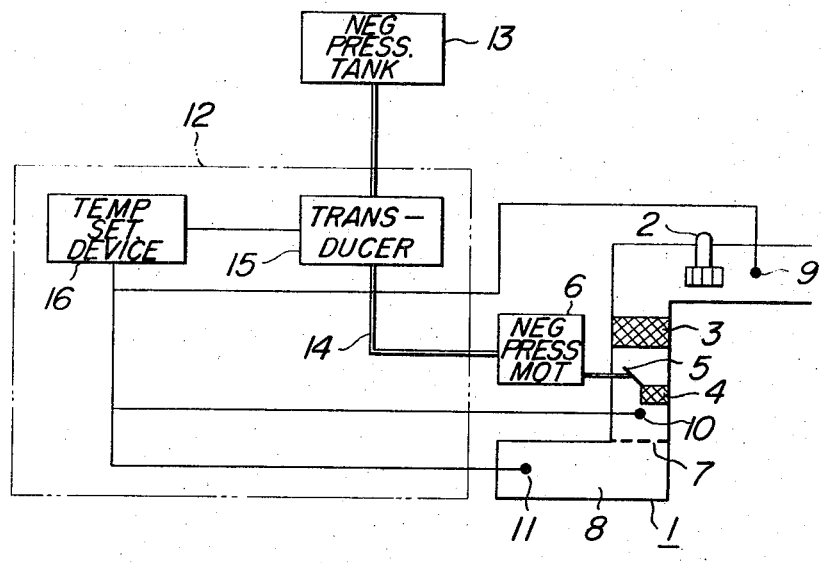
FIG. 1 is a block diagram of an automobile air conditioner to which is applied the present invention.
Figure 2:
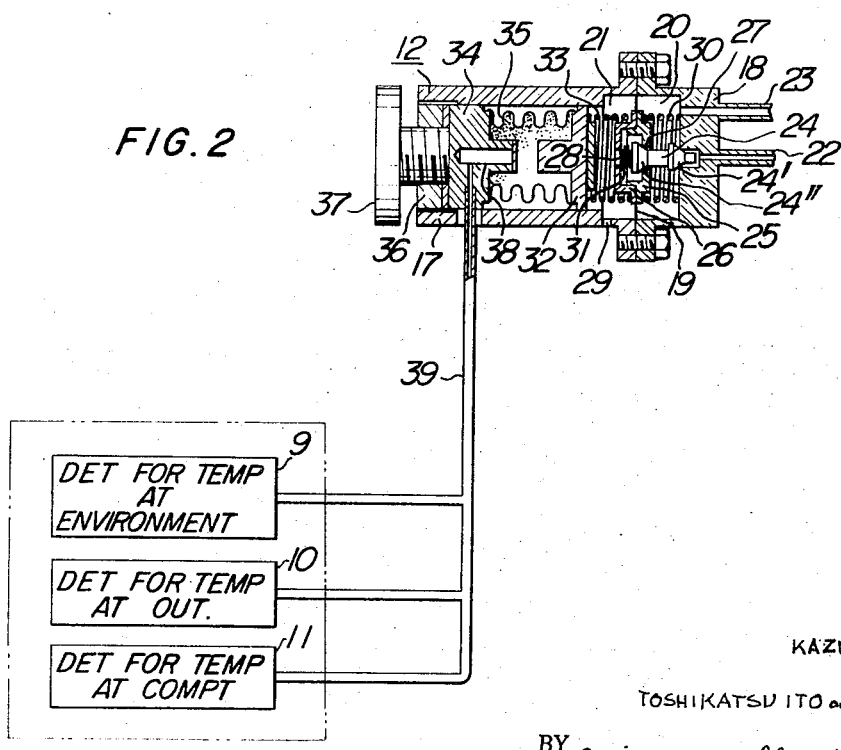
FIG. 2 is a sectional view of a first embodiment of an automatic temperature controller in accordance with the present invention.
Figure 3:
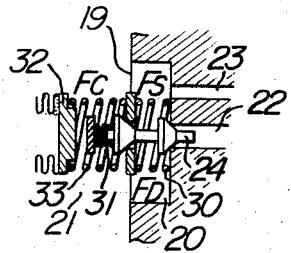
FIG. 3 is a fragmentary sectional view thereof on enlarged scale for explanation of the mode of operation.

Referring to FIGS. 1 and 2, a first embodiment in which the present invention is applied to an automobile air conditioner will be described. Reference numeral 1 designates a case of an air conditioner; 2 a blower; 3, an evaporator; 4, a heater core; 5, a temperature control valve; 6, a negative pressure motor; 7, an outlet of the air conditioner; 8, a compartment; 9, a temperature measuring instrument for detecting the environmental temperature; 10, a temperature measuring instrument for detecting the temperature of air discharged out of the outlet 7; 11, a temperature measuring instrument for detecting the temperature within the compartment 8; 12, a temperature controller including a transducer 15 disposed on a pipe 14 communicating between the negative pressure motor 6 and a negative pressure tank 13 for converting a substantially constant negative pressure within the tank 13 into a negative pressure in accordance with a controlled variable to determine the opening of the temperature control valve 5 in accordance with the converted negative pressure applied to the negative pressure motor 6; and 16, a temperature setting device.

Referring to FIG. 2, between a cylinder 17 of the temperature controller 12 and a valve case 18 is interposed a diaphragm 19, a negative pressure chamber 20 is defined on the side of the valve case 18 while an atmospheric pressure chamber 21 on the side of the cylinder 17. The valve case 18 is provided with nipples 22 and 23 which are communicated with the negative pressure tank 13 and the negative pressure motor 6 through the lines 14 respectively. One valve 24' of a double-head valve 24 which is fixed to the diaphragm 19 is disposed in opposed relation with the opening of the nipple 22 into the negative pressure chamber 20 so as to control the negative pressure. A valve seat 25 into which is housed the other valve 24'' of the double-head valve 24 is fitted into a spring retainer 26, and the diaphragm 19 is between abutments of the valve seat 25 and the spring retainer 26. The negative pressure chamber 20 is communicated with the atmospheric pressure chamber 21 through a passage 27 formed through the valve seat 25 and a passage 28 formed through the spring retainer 26. The atmospheric pressure chamber 21 is communicated with the atmosphere through a vent 29. A spring 30 is interposed between the valve case 18 and the valve seat 25 and a spring 31 is interposed between the valve 24'' and the spring retainer 26. Another spring 33 is interposed between the spring retainer 26 and a cap member 32 of a bellows 35, which is slidably fitted into the cylinder 17. The bellows 35 is disposed between the cap member 32 and a bottom member 34 which is also slidably fitted into the cylinder 17. A temperature adjusting screw 36 is screwed into the left end of the cylinder 17, and a temperature control dial 37 is screwed into the screw 36 in such a manner that the forward end of the stem of the temperature control dial 37 may be made in contact with the bottom member 34 of the bellows. A passage 38 is formed axially in the bottom member 34 and is communicated with the temperature measuring instruments 9, 10 and 11 through a capillary tube or line 39, and also with the interior of the bellows 35. The bellows 35, the passage 38, the line 39 and the temperature measuring instruments 9, 10 and 11 are filled with a temperature sensitive liquid or gas. It is of course possible to fill the closed liquid or gas circuits with different liquids or gases.

Next the mode of operation will be described. First, a desired temperature is set by the temperature adjusting dial 37. When there is no difference between the actual temperature in the compartment and the temperature set, the following relation is held $$Fs = F_D + Fc$$

where
$Fs$ = the force of the spring 30;
$F_D$ = the force due to a negative control pressure (output pressure) exerted to the diaphragm 19; and
$Fc$ = the force of the spring 33.

That is the forces $Fs$, $F_D$ and $Fc$ are balanced. On the other hand, when the temperatures detected by the temperature measuring instruments increases, liquid filled in the instruments expands so that the bellows is displaced to compress the spring 33. Therefore the force of the spring 33 is increased to ($Fc + f$), where $f$ is an increment produced by the displacement of the bellows. Therefore, the equilibrium is no longer maintained, and the air is introduced into the negative pressure chamber 20 through the space between the valve 24" and the valve seat so that the equilibrium given by the following equation is restored.

$$Fs = (F_D - f) + (Fc + f)$$

Therefore, the pressure is decreased by a magnitude corresponding to the force f so that the control pressure acting on the motor 6 changes.

On the other hand, when the temperature decreases, the liquid contracts to displace the bellows 35. As a consequence the force acting on the spring 33 is decreased to ($Fc - f'$), and the equilibrium is lost. Therefore, the air flows out of the negative pressure chamber 20 through the space between the valve 24' and the valve seat on the side of the valve case 18 until the equilibrium given by the following relation is restored.

$$Fs = (F_D + f') + (Fc - f')$$

The negative pressure is increased and the control pressure varies.

The position of the bottom member 34 of the bellows 35 may be varied by rotating the temperature setting dial 37 so that the force exerted to the spring retainer 26 from the spring 33 is varied, whereby a temperature to be controlled or maintained may be varied.

Figure 4:
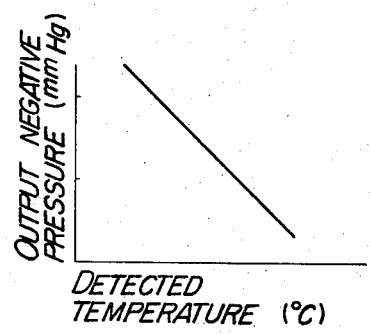
FIG. 4 is a graph illustrating the operation characteristic thereof.

FIG. 4 is a graph illustrating the relationship between the sum of temperatures detected by the respective temperature measuring instruments multiplied by a constant respectively and the output negative pressure in mm Hg. It is seen that the relationship is linear.

Figure 5:
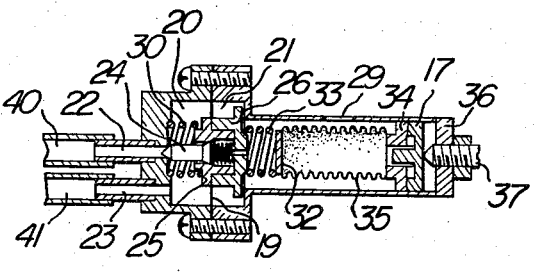
FIG. 5 is a sectional view illustrating a second embodiment of the present invention.

Next a second embodiment of the present invention will be described hereinafter by reference to FIG. 5. The cylinder 17 is made of a thin metal sheet, and a vent 29 of a large diameter is formed so that the liquid or gas filled in the bellows 35 may expand or contract depending upon the environmental temperature around the cylinder 17. As with the first embodiment the force exerting to the spring 33 varies depending upon the temperature and the opening of the double-head valve 24 varies accordingly. In the second embodiment, the temperature controllers may be installed instead of the temperature measuring instruments. That is, the temperature measuring instruments may be dispensed with. In the first embodiment, the capillary tube or line 39 must be thermally insulated, but in the second embodiment, the line 39 is eliminated and negative pressure lines 40 and 41 which are not required to be thermally insulated are provided.

In the temperature controller in accordance with the present invention, the negative pressure may be controlled only depending upon the equilibrium among the forces, and the time interval the double-head valve is opened is very short so that the consumption of the air under negative pressure except that used for driving the pneumatic motor may be minimized. Furthermore, the variation in the temperature measuring instrument is directly utilized for controlling the double-head valve so that the operation is stabilized with a quick response. Moreover, the temperature controller in accordance with the present invention may be assembled in a simple manner with a minimum number of component parts and at a less cost.

What is claimed is:

1. An automatic temperature controller for air conditioners comprising a valve case having first and second ports for communicating with a negative pressure source and an output means, respectively;

a cylinder member connected to said valve case;

a diaphragm positioned between said valve case and said cylinder member to define a negative pressure chamber on the side of said valve case and an atmospheric pressure chamber on the side of said cylinder member;

a valve seat member carried by said diaphragm and having a passage for communicating between said negative pressure chamber and said atmospheric pressure chamber;

a double-head valve fixed to said diaphragm and extending coaxially with said passage, said double-head valve being provided with a first valve element at one end thereof for opening and closing said first port and a second valve element at the other end thereof for opening and closing said passage;

a first spring means for biasing said double-head valve toward a position in which said first and second valve elements close said first port and said passage, respectively;

a second spring means loaded between said diaphragm and said valve case;

said first and second valve elements being arranged to simultaneoulsy close said first port and said passage, respectively, when said diaphragm is in a neutral position, and open only said first port when said diaphragm is displaced from said neutral position toward one side thereof and only said passage when said diaphragm is displaced from said neutral position toward the other side thereof;

a temperature-sensitive member disposed in said cylinder member which is displaced in response to the variation in temperature detected by temperature measuring means; and a third spring means loaded between said diaphragm and said temperature-sensitive member.

2. An automatic temperature controller as set forth in claim 1 further comprising a temperature setting dial mounted in one end of said cylinder member engaging one end of said temperature sensitive member so that the reference point of said temperature sensitive member may be adjusted.

3. An automatic temperature controller as set forth in claim 1 wherein said temperature-sensitive member directly measures the temperature around said cylinder member and displaces itself.

4. An automatic temperature controller as set forth in Claim 1 wherein said first spring means is disposed in at least one of said negative pressure chamber and said atmospheric pressure chamber.

5. An automatic temperature controller as set forth in claim 1 wherein said cylinder member has an enlarged inner diameter on the side of said valve case to define said atmospheric pressure chamber, said cylinder member and valve case have a thin-wall construction and said cylinder member is formed with a plurality of holes through the side wall thereof.

6. An automatic temperature controller as set forth in claim 1 wherein a fine-adjusting screw is provided behind said temperature-sensitive member.

7. An arrangement according to claim 1, wherein said temperature-sensitive means includes bellows, said third spring means engaging one end of said bellows and one side of said diaphragm.

8. An arrangement according to claim 7, wherein said second spring means engages the other side of said diaphragm and a wall of said valve case.

9. An arrangement according to claim 7 wherein the temperature measuring means includes a temperature sensitive fluid disposed in said bellows responsive to temperature variation in the area of said housing.

10. An automatic temperature controller as set forth in claim 2 wherein said temperature-sensitive member is a bellows;

said third spring means is loaded between one end of said bellows and said diaphragm; and said temperature setting dial is made in contact with the other end of said bellows.

11. An automatic temperature controller as set forth in claim 10 wherein the temperature measuring means are hydraulically or pneumatically communicated with the interior of said bellows through conduits and a passage provided in said other end of said bellows.

12. An automatic temperature controller as set forth in claim 1 wherein said controller is used in an automobile.

13. An automatic temperature controller as set forth in claim 12 wherein temperature measuring means measures the temperature ambient the automobile, the temperature in the automobile compartment, the temperature of the air discharged from the air conditioner, said measured temperatures being transmitted through a single conduit to said temperature sensitive member.

* * * * *